May 13, 1930. M. LEUCHT 1,758,288
CAKE PAN
Original Filed Dec. 13, 1924 2 Sheets-Sheet 1
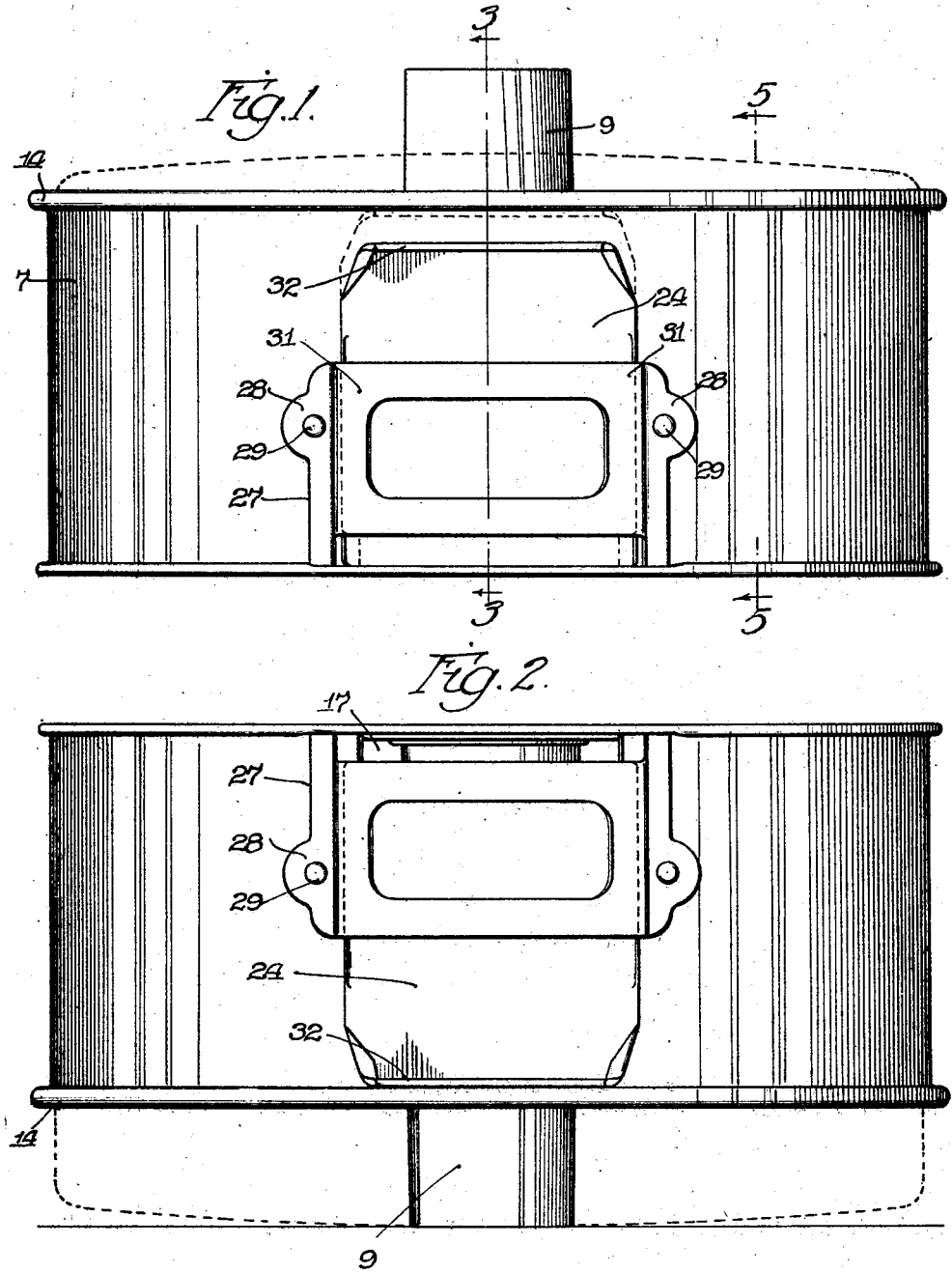

May 13, 1930. M. LEUCHT 1,758,288
CAKE PAN
Original Filed Dec. 13, 1924 2 Sheets-Sheet 2
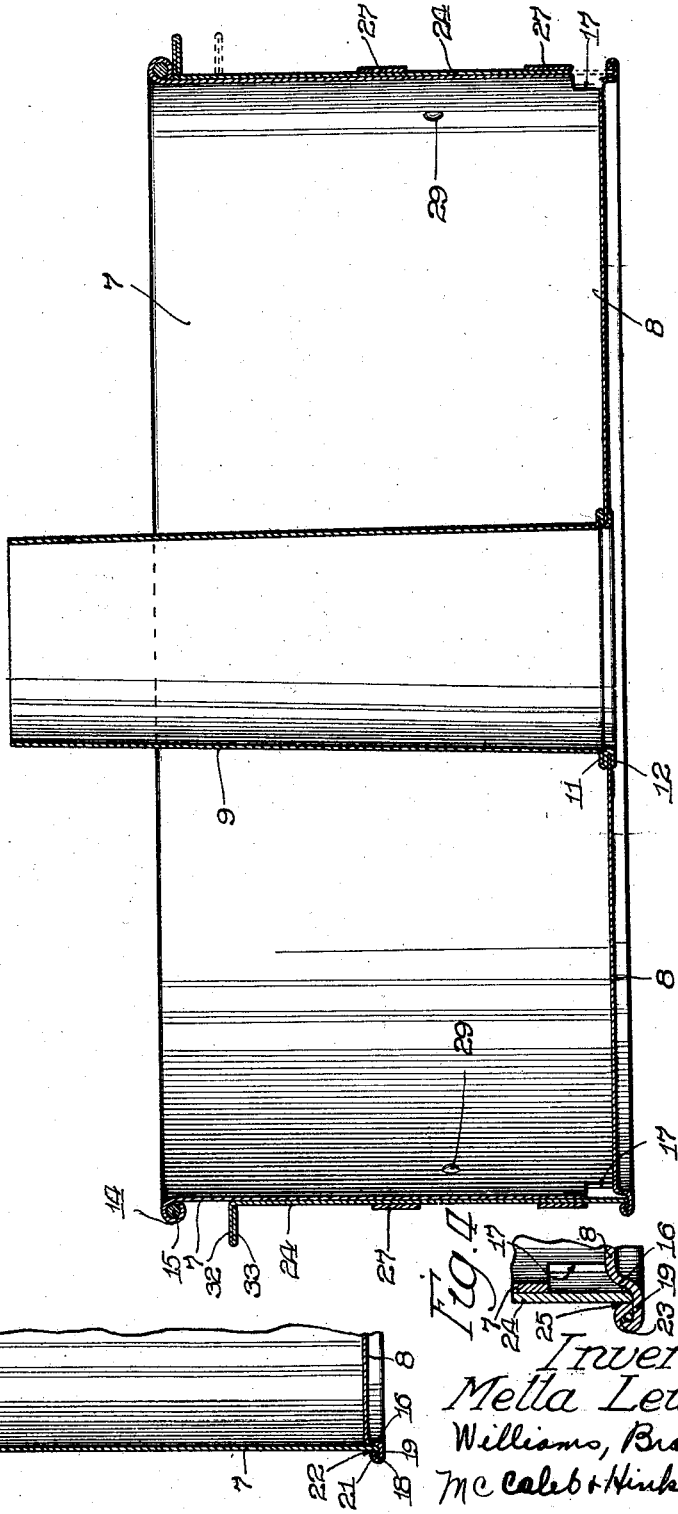

Patented May 13, 1930

1,758,288

UNITED STATES PATENT OFFICE

MELLA LEUCHT, OF TERRE HAUTE, INDIANA, ASSIGNOR TO EDWARD KATZINGER COMPANY, OF CHICAGO, ILLINOIS, A CORPORATION OF ILLINOIS

CAKE PAN

Application filed December 13, 1924, Serial No. 755,615. Renewed October 23, 1929.

My invention relates to cake pans, and has particular reference to a cake pan having one or more openings in its side wall to permit the insertion of a knife or the like for loosening the cake from the bottom of the pan after baking. Such opening or openings are adapted to be covered by slidable plates which have guided support on the pan whereby they may be raised or lowered to open or close these openings.

The fundamental object of the invention is to improve upon the particular construction of these lateral openings and their relationship to the bottom and side walls and the slidable cover plates.

One of the specific objects of the invention is to provide an improved design of raised bottom wall; and to provide a unique shaping or folding of the metal at the bottom edges of these openings to the end of: (1) obtaining an opening which extends down to or below the bottom wall of the cake pan so that the knife can be inserted flatwise across the bottom of the pan in loosening the cake, and (2) obtaining a closer fitting joint between the bottom edge of the slidable plate and the bottom of the opening.

Other objects will be apparent from the following description of a preferred embodiment of my invention. In the drawings illustrating this embodiment:

Figure 1 is an elevational view of the cake pan in upright position;

Figure 2 is a similar view showing the cake pan inverted in the process of cooling and loosening the cake;

Figure 3 is a transverse sectional view through the pan, taken on a plane passing through the two lateral openings;

Figure 4 is an enlarged detail section showing the formation of the bottom of the opening, and Figure 5 is a fragmentary transverse section taken on the plane of the line 5—5 of Figure 1.

The pan is preferably, although not necessarily, constructed in cylindrical form, and is made of tin or any other desired sheet metal. It comprises a cylindrical side wall 7 and a circular bottom wall 8. Rising from the center of the bottom wall 8 is a tube 9, the lower end of which has upper and lower flange portions 11 and 12 which are crimped or beaded over on the upper and lower sides of the bottom wall 8. This central tube is advantageous for conducting heat to the center of the cake in baking, and by extending the upper end thereof considerably above the top edge of the pan I make additional use of this tube as a support for the pan when the latter is inverted in the act of removing the cake, as shown in Fig. 2. In order that successive pans, when stacked for shipment, will nest properly, it is desirable to taper the central tube either at the upper end or throughout its entire length.

The upper edge of the side wall 7 is beaded, as indicated at 14, preferably by curling the metal around a wire 15. In joining the lower edge of this side wall 7 to the bottom wall 8, the latter is first formed with a downwardly turned flange 16 to the end of raising the entire bottom wall from side to side of the cake pan. The portions of the lower edge of the side wall 7 lying between the lateral openings 17 are provided with narrow, outwardly extending flanges 18, as shown in Fig. 5. A horizontal flange 19 is turned outwardly from the lower edge of the downwardly extending flange 16 of the bottom wall to receive the outwardly extending flange 18 of the side wall. The protruding metal of the bottom wall is then curved around and over the top of the flange 18 in the form of an upper locking flange 21 which rigidly joins the side and bottom walls of the pan. The extreme peripheral edge of the metal may be curled inwardly or downwardly, as indicated at 22, to obviate any sharp edges.

Referring now to the openings 17, it will be observed that these consist of horizontal slots which are preferably cut at diametrically opposite points in the side wall of the pan. The lower edge of the side wall is cut away entirely in forming these openings, and the peripheral edge of the bottom wall has the slightly different shaping in the locality of the slots shown in Figs. 3 and 4. The outer edge of the horizontal bottom flange 19 is folded over upon itself directly in these openings to form a front retaining wall 23 in each opening for engaging the outer side of the slidable cover plate 24. The space between this outer retaining wall 23 and the inner retaining wall defined by the flange 16 forms a recess 25 for receiving the lower edge of the plate 24. Attention is directed to the fact that this recess 25 is entirely below the top surface of the bottom wall and that when the plate 24 is moved down to a completely closed position, its lower edge will lie below the top surface of the bottom wall 8.

It should also be noted that the upper edge of the inner retaining wall 16 is at the upper surface of the pan bottom whereas the upper edge of the outer retaining wall 23 is at an appreciably lower level so that if the lower edge of the slide 24 will not fit into the recess 25 between the retaining walls by movement all the way to the upper surface of the flange 17 or nearly so, a partial recess will be formed at 25 by the lower edge of the slide 24 striking against the upper edge of the retaining wall 23 to limit the lower edge of the slide 24 at a position below the upper surface of the pan bottom; that is to say, if the slide cannot fully enter the recess 25 the upper edge of the wall 23 will serve as an abutment for the lower edge of the slide and co-operate with such lower edge and part of the retaining wall 16 to close the lower edge of the slot 17 by the lower edge of the slide partially entering the recess at the point designated 25 in Fig. 4 of the drawings.

The plates 24 are guided along their vertical edges by guides 27, which consist of one-piece stampings punched from sheet metal. These guides comprise lateral attaching flanges 28 which are secured to the side wall 7 by rivets 29. The guide flanges 31 are raised to protrude from the side wall 7 and form guideways therebetween. The upper edge of each plate 24 is flanged outwardly, as indicated at 32, and a continuation of the metal is then punched backwardly under this flange or lip, as shown at 33. The lateral edges of each plate which protrude above the guide 27 are folded over diagonally, in order to obviate sharp edges on these closing plates. The upper flange or lip 32 forms a handle for raising and lowering the plate and, by engaging the upper bead 14, forms a stop for limiting the upward movement of the plate.

The guides 27 effectively prevent leakage along the lateral edges of the closure plates 24. The joint at the bottom edge of the opening is effectively closed by contact between the bottom edge of the plate 24 and the bottom of the recess 25, and by contact between either the outer or inner sides, or both, of the plate 24 and the side walls 23 and 16 of the recess. It will be noted that the lower edge of the opening 17 extends down completely to the top surface of the bottom wall 8, so that a knife can be inserted flatwise across this surface of the bottom wall in loosening the cake.

Inasmuch as the guides 27 consist of one-piece stampings punched from sheet metal, each comprises elongated cross-plates where raised to protrude from the side walls 7. As shown in Fig. 3 these elongated cross-plates fit close against the outer surface of the slide plate closures 24, one elongated cross-plate being located midway between the top and bottom of the pan and the other being located just above the slot 17. It will also be seen that the lower legs of the lateral vertical guides 27 for the vertical lateral edges of the slide or closure or shutter 24 extend all the way down to the retaining wall 23. The width of the shutter or closure 24, is greater than the length of the slot 17 as shown in Figs. 1 and 2. The elongated cross-plates act as guides to direct the lower edge of the slide or shutter 24 vertically downward into the recess 25 while holding the slide or shutter close against the outer side wall of the pan and over the ends of the slot 17. Such elongated holding means is particularly useful when the lower edge of the slide can only partially enter the recess 25 because then instead of relying on the recess 25 to hold the lower portion of the slide in position to form an effective closure against leakage, the elongated cross-plates of the guide 27 may be relied on to retain the slide in snug fitting relation with the ends of the opening 17, the lower edge of such opening being closed at the recess 25. All portions of the plate 24 are therefore held at all times in close fitting relation with the outer wall of the pan, which is particularly desirable when the opening 17 is closed. The lateral vertical guides for the vertical edges of the slide facilitate directing the slide vertically downward and holding the lower edge of the slide in parallelism with the bottom of the pan but such vertical guides alone may not be sufficient to hold the slide in close engagement with the outer wall of the pan at intermediate portions. I would prefer to retain the elongated cross-plates and provide a narrower slide without vertical guides for the edges of the slide than omit the cross-guide for holding the body portion of the slide close against the pan wall. It will also be seen that the slide or shutter 24 is not detachable.

To prepare the pan for filling, the two plates 24 are thrust downwardly to project their lower edges in firm engagement with the recesses 25. During baking, these plates remain closed. When the cake is to be cooled, the pan is removed from the oven, inverted, and made to stand on the central tube 9, as shown in Fig. 2. In removing the cake from the pan, it may be maintained in its inverted position, and the plates 24—24 pressed downwardly to expose the openings 17—17 in the side wall 7, allowing air to enter between the bottom of the cake and the pan bottom and thereby removing atmospheric pressure as a factor in holding the cake in the inverted pan. A thin knife blade may be inserted through the openings 17—17 to facilitate the separation of the bottom of the cake from the pan bottom 8.

When the pan is inverted the downward movement of the shutters 24 is limited by the bead 15 acting as an abutment. As above explained the cover, shutter or slide 24 is confined at all times in close fitting relation with the outer wall of the pan and can not be removed from the pan. The guides on opposite sides of the opening 17 may in some instances be sufficient alone to retain the plate over the opening and aline it with the retainer for the lower edge of the slide but it can readily be seen that to secure greater assurance that the slide or shutter will be retained over the opening 17 flush against the upright wall and to secure better alinement of the intermediate portions of the lower edge of the slide with the retainer below it, the elongated cross-pieces or webs should be used. The upright guides confine the plate against lateral displacement of the slide, the upper rim 14 and the lower wall 23 act as stops or abutments against endwise vertical detachment of the slide from the pan, and the double cross-piece or web confines the slide to close contact over its whole inner area with the outer wall of the pan and therefore it is evident that the slide will be guided accurately to its closed position where its lower edge will be embraced by the retaining walls 16 and 23. The cross-piece or web therefore co-operates with the retainer for the lower edge of the slide in securing a dough-tight fit of the slide over the opening 17. However, by the use of the cross-piece or web riveted securely to the pan, as shown, in rigid relation therewith, the slide will be directed to and held against the wall 16 to efficiently cover the opening 17 even though the lower wall 23 may be so distorted as not to permit full descent of the slide into the recess 25.

I claim:

1. A cake pan comprising a side wall, a bottom wall, said side wall having an opening therein, a slidable plate for covering said opening, said bottom wall comprising a downwardly extending flange, a horizontally extending flange projecting from said downwardly extending flange, and a turned over flange at the outer edge of said horizontal flange to form a channel-shaped recess at the bottom of said opening, the upper edge of said turned over flange being below the upper surface of the bottom of the pan.

2. A cake pan comprising a side wall, a bottom wall, said side wall having an opening therein, a slidable plate for covering said opening, said bottom wall comprising a downwardly extending flange, a horizontally extending flange projecting from said downwardly extending flange, and a turned over flange at the outer edge of said horizontal flange to form a channel-shaped recess at the bottom of said opening, the upper edge of said turned over flange and all portions of said channel-shaped recess being disposed below the top surface of said bottom wall.

3. A cake pan comprising a side wall, a bottom wall, said side wall having an opening therein, a slidable plate for covering said opening, and a one-piece guide for guiding both lateral edges of said plate.

4. A cake pan comprising a side wall, a bottom wall, said side wall having an opening therein, a slidable plate for covering said opening, and a one-piece guide for said plate comprising two lateral guide flanges spaced from said side wall and two attaching flanges secured to said side wall.

5. A bake pan comprising a bottom, an upright wall extending upwardly from the bottom and having a narrow opening thereon in position for the insertion of a knife along the upper surface of such bottom beneath baked material to loosen the same, a shutter slidable vertically to cover and uncover said opening, means secured to said upright wall between the top and bottom of the pan and extending across said shutter to guide the shutter to open and closed positions and to confine it closely to said upright wall, and abutments for limiting the upright movements of said shutter.

6. In a bake pan, the combination with a bottom, of an upright wall secured to said bottom, with a rim at the top thereof and a narrow elongated opening at the bottom thereof with a laterally projecting flange at the lower side of said opening, a sliding shutter for said opening limited in its movements by the pan rim and said flange, and means secured to said upright wall intermediate the top and bottom thereof in position to engage said shutter transversely to hold the same in close sliding contact along its inner surface with the body portion of the outer wall of said pan while co-acting with said rim and flange to prevent detachment of the shutter from the pan.

7. A bake pan comprising a cylindrical upright wall of sheet metal having a laterally projecting wired rim at its upper edge, a bottom of sheet metal secured to said upright wall to leave a flange at the periphery of said bottom for supporting the pan with said bottom raised from the surface on which it rests, said wall having an opening the lower edge of which is in position to permit a knife to be inserted through said opening in the plane of the upper surface of said bottom above a laterally projecting portion of said flange adjacent said opening, a sheet metal shutter slidable vertically below said rim to cover and uncover said opening, and means secured to the pan wall below said rim for engaging said shutter transversely to hold it close to the pan wall and confine it against lateral displacement while the rim above the shutter and the flange below it prevent vertical detachment thereof.

8. In a bake pan, the combination with an upright wall having an elongated opening therein, of a bottom connected to said wall, a vertically movable shutter for said opening, a retainer for the lower edge of said shutter below the upper surface of said bottom, and means secured to the pan wall to engage said shutter intermediate its ends and extend across the same below the upper edge of said upright wall and co-act with said retainer to hold the shutter closed.

9. In a bake pan the combination with a bottom, of an upright wall with an elongated opening, having its lower edge at the said bottom to enable a knife to be inserted into the pan along the upper surface of the said bottom, a laterally extending flange below said opening with the upper edge of said flange below the upper surface of said bottom, a shutter for said opening, and means secured to said pan in position to engage said shutter transversely to hold it against the said wall for movement to closed position against said lowered flange.

10. A pan having a side wall with an opening therein, a sliding cover for the opening, and means for confining the said cover to the pan and guiding said cover to open and closed positions, said means comprising vertical guides for the lateral edges of the cover and a cross-connecting web plate to engage intermediate portions of the cover and hold the same against the said wall when closing said opening.

11. A pan having a side wall with an opening therein, a sliding shutter for said opening, and guiding means for the shutter comprising a web plate extending across the shutter to hold the same against the pan wall.

12. A bake pan having a side wall with an opening therein, a sliding shutter for said opening, means secured to the pan in position to engage the shutter transversely and hold the same against the pan wall, and a retainer for receiving and embracing the lower edge of said shutter to co-act with said engaging means to hold the shutter with a dough-tight fit over said opening.

13. A bake pan having a side wall with an opening therein, a sliding shutter for said opening, and a one piece stamping punched from sheet metal with an offset connecting web adapted to be secured to said wall to confine said shutter for sliding movement behind said web within the limits of the top and bottom of the pan.

14. A pan having a side wall with an opening therein, a sliding cover for said opening, and means for confining said cover to said pan for limited movement relatively thereto comprising a one piece stamping having securing means and an offset connecting web for embracing transversely the said cover to confine the same as aforesaid.

15. A pan having a side wall with an opening therein, a sliding cover for said opening, and a one-piece stamping punched from sheet metal with flanges riveted to the pan wall and with an offset connecting web protruding from the side wall to receive and embrace the cover to confine the same to the pan and hold the same close to the outer wall thereof when moved to its closing position.

16. In a bake pan, the combination with a sheet metal cylindrical wall, of a sheet metal bottom raised from the surface on which the pan rests by a flange formed by connecting the peripheral edge of the bottom to the lower edge of said wall, a vertically slidable shutter of sheet metal for an elongated opening in the side wall with the bottom of said opening at the upper surface of the pan bottom, a retainer below the plane of said upper surface and below said opening in position to receive and embrace the lower edge of said shutter, a sheet metal plate riveted to the pan wall and having upright spaced apart guides for the lateral edges of said shutter and two offset connecting webs one adjacent the top of said opening and the other midway between the top and bottom of the pan, said webs engaging the body portion of said shutter to hold the same against the pan wall, and an upper laterally projecting rim for the pan in position to act as an upper abutment for said slide to prevent detachment thereof from the pan.

17. A bake pan comprising a side wall having an opening therein, a bottom connected to said wall, a shutter for said opening, and a guide plate secured to said pan wall and comprising an offset connecting web above and adjacent to the said opening to engage said shutter and hold the same against the said wall when the shutter is in closed position.

18. A pan having a side wall with an opening therein, a sliding cover for the opening and means for securing the cover to the pan, comprising guideways stamped from a single piece of metal and secured to the side wall along opposite sides of the opening therein, an integral connecting web between the guideways overlying the cover, stops positioned above and below the opening in the side wall for limiting the sliding movement of the cover, the stop below the opening in the side wall comprising a flange adapted to embrace the lower edge of the cover and the stop above said opening comprising a bead on the upper edge of the side wall and a projection on the side of the cover adapted to abut against said bead.

19. A pan having a side wall with an opening therein, a sliding cover for the opening, and means for securing the cover to the pan, comprising guideways secured to the side wall along opposite sides of the opening therein, stops positioned above and below the opening in the side wall for limiting the sliding movement of the cover, the stop below the opening in the side wall comprising a flange adapted to embrace the lower edge of the cover and the stop above said opening comprising a bead on the upper edge of the side wall and a projection on the side of the cover adapted to abut against said bead, the guideways being constructed from one piece stampings punched from sheet metal having attaching flanges, and an offset connecting web, said web protruding from the side wall of the pan with the cover confined therebetween.

20. A pan having a side wall with an opening therein, a sliding cover for said opening and means for securing the cover to the pan, comprising a one piece stamping punched from sheet metal to provide attaching flanges and an offset connecting web, said web protruding from the side wall of the pan with the cover confined therebetween.

21. A pan having a side wall with an opening therein, a sliding cover for said opening and means for securing the cover to the pan, comprising a one piece stamping punched from sheet metal to provide attaching flanges and an offset connecting web, said web protruding from the side wall of the pan with the cover confined therebetween and means on the pan for limiting the sliding movement of the cover.

In witness whereof, I hereunto subscribe my name this 10th day of December, 1924.

MELLA LEUCHT.